United States Patent
Rajagopalan

(10) Patent No.: US 8,384,737 B2
(45) Date of Patent: *Feb. 26, 2013

(54) METHOD AND SYSTEM FOR FAST CLIPPING OF LINE SEGMENTS

(75) Inventor: Ramgopal Rajagopalan, Waterloo (CA)

(73) Assignee: Research In Motion Limited, Waterloo, Ontario (CA)

(*) Notice: Subject to any disclaimer, the term of this patent is extended or adjusted under 35 U.S.C. 154(b) by 0 days.

This patent is subject to a terminal disclaimer.

(21) Appl. No.: 13/480,911

(22) Filed: May 25, 2012

(65) Prior Publication Data

US 2012/0229502 A1 Sep. 13, 2012

Related U.S. Application Data

(63) Continuation of application No. 12/429,414, filed on Apr. 24, 2009, now Pat. No. 8,207,988.

(60) Provisional application No. 61/078,247, filed on Jul. 3, 2008.

(51) Int. Cl.
*G09G 5/00* (2006.01)

(52) U.S. Cl. .......... 345/620; 345/581; 345/672

(58) Field of Classification Search .......... None
See application file for complete search history.

(56) References Cited

U.S. PATENT DOCUMENTS

| | | | |
|---|---|---|---|
| 4,642,790 A * | 2/1987 | Minshull et al. .......... 715/784 |
| 4,731,606 A | 3/1988 | Bantz et al. | |
| 5,195,177 A | 3/1993 | Kamiyama et al. | |
| 5,357,599 A | 10/1994 | Luken | |
| 5,384,903 A | 1/1995 | Herrod | |
| 5,418,897 A | 5/1995 | Capri et al. | |
| 5,455,897 A | 10/1995 | Nicholl et al. | |
| 5,579,459 A | 11/1996 | Jennyc | |
| 5,613,052 A | 3/1997 | Narayanaswami | |
| 5,777,618 A | 7/1998 | Kita et al. | |
| 6,359,630 B1 | 3/2002 | Morse et al. | |
| 6,864,899 B1 * | 3/2005 | Barrus et al. .......... 345/620 |
| 7,489,318 B1 * | 2/2009 | Wilt .......... 345/582 |
| 8,018,452 B1 * | 9/2011 | Dow .......... 345/418 |
| 2003/0043173 A1 * | 3/2003 | Wasserman et al. .......... 345/672 |
| 2005/0270311 A1 | 12/2005 | Rasmussen et al. | |
| 2007/0263007 A1 | 11/2007 | Robotham et al. | |

OTHER PUBLICATIONS

Foley et al., "Computer Graphics: Principles & Practice in C", Second Edition, Systems Programming Series, Aug. 14, 1995, pp. 111-130.

PCT Application No. PCT/CA2009/000571, Written Opinion and ISR dated Aug. 21, 2009.

* cited by examiner

*Primary Examiner* — Ryan R Yang
(74) *Attorney, Agent, or Firm* — Alexander Anishchenko; Borden Ladner Gervais LLP

(57) ABSTRACT

A method of static graphics rendering in a mobile device. Panning increments are received for panning a previously rendered frame to a panned frame. A rendering region is then determined based on the panning increments. A candidate line segment or polyline is then clipped to create clipped line segments contained within the rendering region. The clipped line segments can then be rendered, and a portion of the previously rendered frame can be copied, to provide the panned frame.

15 Claims, 8 Drawing Sheets

METHOD AND SYSTEM FOR FAST CLIPPING OF LINE SEGMENTS

CROSS-REFERENCE TO RELATED APPLICATIONS

This is a continuation of U.S. application Ser. No. 12/429,414 filed Apr. 24, 2009, which claims the benefit of priority of U.S. Provisional Patent Application No. 61/078,247, filed Jul. 3, 2008, which is incorporated herein by reference.

TECHNICAL FIELD

The present application relates graphics rendering. In particular, the present application relates to a method and system for fast clipping of line segments to render static graphic images.

BACKGROUND DISCUSSION

Line clipping methods and algorithms are well known in the field of computer graphics. In computer graphics, clipping refers to an optimization step where only portions of the vector or raster image that are visible to the user are drawn. This can save processing time, on parts of the image that do not fall into any visible region of the display. For 2D vector graphics data such as polygons and lines, clipping consists of deciding which of the vector data would be completely visible or completely invisible or partially visible. For the former two cases, the system either completely draws or throws away the respective geometry and for the partially visible case the geometry is 'cut' such that only the visible portion is drawn. For example, a line segment is intersected with the visible boundary of the display to come up with a shorter line segment that is completely contained within the bounds of the display. Hence clipping is used to accelerate the time taken to render graphics to the display.

Well known line clipping methods include the Cohen-Sutherland method, in which, for rectangular windows, the four edges of the clip window are extended, and nine regions are created from their intersection, of which only the middle region (viewport) is visible. The Cohen-Sutherland method includes, excludes or partially includes lines based on the regions in which the endpoints lie. The Liang-Barsky line clipping method is another popular line clipping algorithm. It uses the parametric equation of a line and inequalities describing the range of the clipping window to determine the intersections between the line and the clipping rectangle. While these methods are effective, they still require significant computational resources and time to render each new frame. This is of particular concern in mobile devices where new and more powerful graphics applications are being deployed, and where computational resources and power usage are at a premium.

It is, therefore, desirable to provide a method and system of clipping lines that is quicker and less computationally intensive than previously known methods.

BRIEF DESCRIPTION OF THE DRAWINGS

Embodiments of the present application will now be described, by way of example only, with reference to the attached Figures, wherein:

FIG. 4 is a block diagram illustrating components of an exemplary configuration of a host system that the portable electronic device can communicate with;

DETAILED DESCRIPTION

Figure 1:
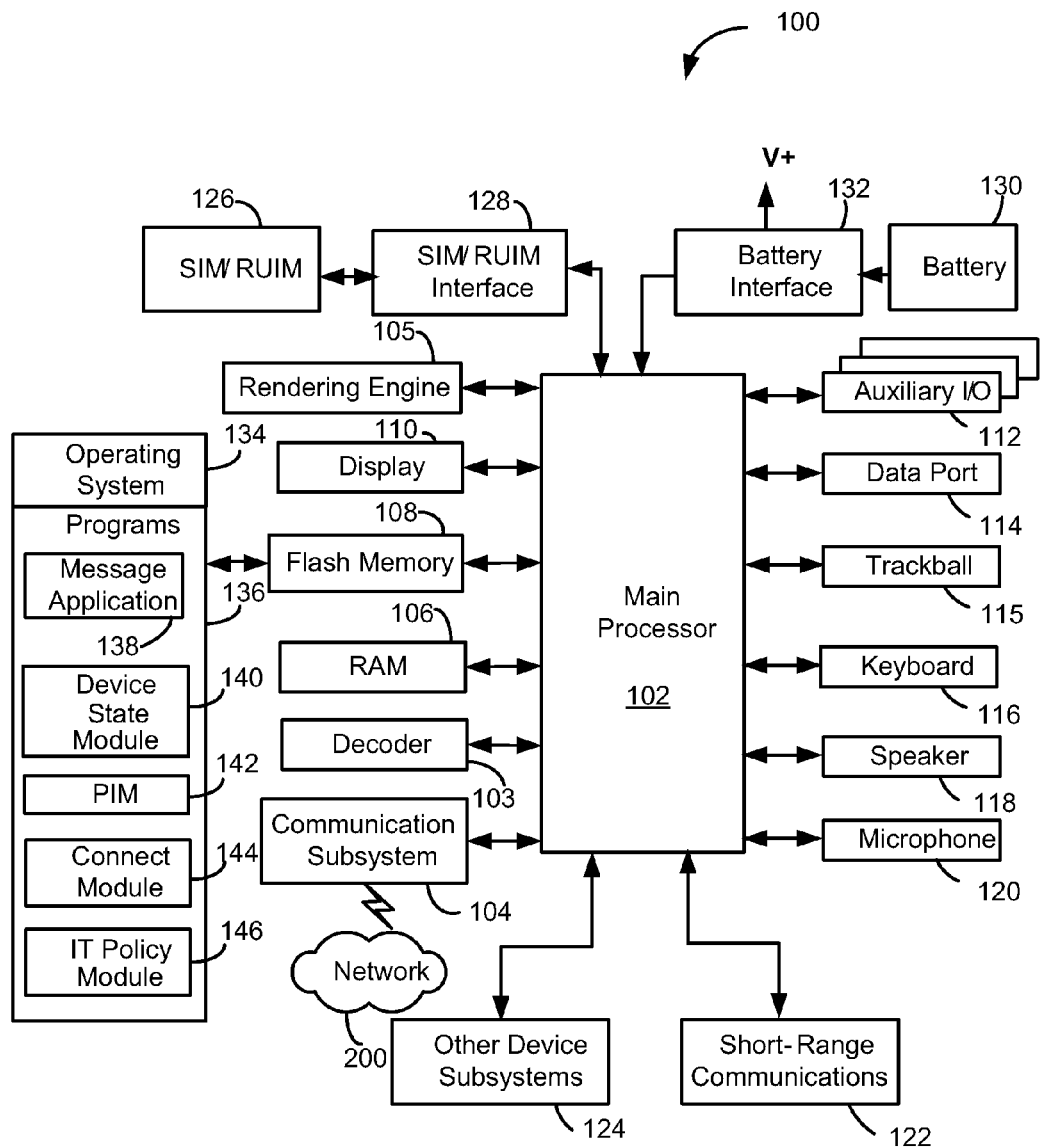
FIG. 1 is a block diagram of an exemplary embodiment of a portable electronic device.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

The embodiments described herein generally relate to portable electronic devices. Examples of portable electronic devices include mobile or handheld wireless communication devices such as pagers, cellular phones, cellular smartphones, wireless organizers, personal digital assistants, computers, laptops, handheld wireless communication devices, wirelessly enabled notebook computers and the like.

The portable electronic device may be a two-way communication device with advanced data communication capabilities including the capability to communicate with other portable electronic devices or computer systems through a network of transceiver stations. The portable electronic device may also have the capability to allow voice communication. Depending on the functionality provided by the portable electronic device, it may be referred to as a data messaging device, a two-way pager, a cellular telephone with data messaging capabilities, a wireless Internet appliance, or a data communication device (with or without telephony capabilities). To aid the reader in understanding the structure of the portable electronic device and how it communicates with other devices and host systems, reference will now be made to FIGS. 1 through 4.

Referring first to FIG. 1, shown therein is a block diagram of an exemplary embodiment of a portable electronic device 100. The portable electronic device 100 includes a number of components such as a main processor 102 that controls the overall operation of the portable electronic device 100. Communication functions, including data and voice communications, are performed through a communication subsystem 104. Data received by the portable electronic device 100 can be decompressed and decrypted by a decoder 103, operating according to any suitable decompression techniques (e.g. YK decompression, and other known techniques) and encryption techniques (e.g. using an encryption technique such as Data Encryption Standard (DES), Triple DES, or Advanced Encryption Standard (AES)). The communication subsystem 104 receives messages from and sends messages to a wireless network 200. In this exemplary embodiment of the portable electronic device 100, the communication subsystem 104 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behavior described herein, and it will also be understood by persons skilled in the art that the embodiments described herein are intended to use any other suitable standards that are developed in the future. The wireless link connecting the communication subsystem 104 with the wireless network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network 200 associated with portable electronic device 100 is a GSM/GPRS wireless network in one exemplary implementation, other wireless networks may also be associated with the portable electronic device 100 in variant implementations. The different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and third-generation (3G) networks such as EDGE and UMTS. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems. The main processor 102 also interacts with additional subsystems such as a Random Access Memory (RAM) 106, a flash memory 108, a display 110, an auxiliary input/output (I/O) subsystem 112, a data port 114, a trackball 115, a keyboard 116, a speaker 118, a microphone 120, short-range communications 122 and other device subsystems 124.

Some of the subsystems of the portable electronic device 100 perform communication-related functions, whereas other subsystems may provide "resident" or on-device functions. By way of example, the display 110, the trackball 115 and the keyboard 116 may be used for both communication-related functions, such as entering a text message for transmission over the network 200, and device-resident functions such as a calculator or task list.

The portable electronic device 100 can send and receive communication signals over the wireless network 200 after network registration or activation procedures have been completed. Network access is associated with a subscriber or user of the portable electronic device 100. To identify a subscriber, a SIM/RUIM card 126 (i.e. Subscriber Identity Module or a Removable User Identity Module) is inserted into a SIM/RUIM interface 128 in order to communicate with a network. The SIM/RUIM card 126 is a type of a conventional "smart card" that can be used to identify a subscriber of the portable electronic device 100 and to personalize the portable electronic device 100, among other things. In the present embodiment, the portable electronic device 100 is not fully operational for communication with the wireless network 200 without the SIM/RUIM card 126. By inserting the SIM/RUIM card 126 into the SIM/RUIM interface 128, a subscriber can access all subscribed services. Services may include: web browsing and messaging such as e-mail, voice mail, Short Message Service (SMS), and Multimedia Messaging Services (MMS). More advanced services may include: point of sale, field service and sales force automation. The SIM/RUIM card 126 includes a processor and memory for storing information. Once the SIM/RUIM card 126 is inserted into the SIM/RUIM interface 128, it is coupled to the main processor 102. In order to identify the subscriber, the SIM/RUIM card 126 can include some user parameters such as an International Mobile Subscriber Identity (IMSI). An advantage of using the SIM/RUIM card 126 is that a subscriber is not necessarily bound by any single physical portable electronic device. The SIM/RUIM card 126 may store additional subscriber information for a portable electronic device as well, including datebook (or calendar) information and recent call information. Alternatively, user identification information can also be programmed into the flash memory 108.

The portable electronic device 100 is a battery-powered device and includes a battery interface 132 for receiving one or more rechargeable batteries 130. In at least some embodiments, the battery 130 can be a smart battery with an embedded microprocessor. The battery interface 132 is coupled to a regulator (not shown), which assists the battery 130 in providing power V+ to the portable electronic device 100. Although current technology makes use of a battery, future technologies such as micro fuel cells may provide the power to the portable electronic device 100.

The portable electronic device 100 also includes an operating system 134 and software components 136 to 146 which are described in more detail below. The operating system 134 and the software components 136 to 146 that are executed by the main processor 102 are typically stored in a persistent store such as the flash memory 108, which may alternatively be a read-only memory (ROM) or similar storage element (not shown). Those skilled in the art will appreciate that portions of the operating system 134 and the software components 136 to 146, such as specific device applications, or parts thereof, may be temporarily loaded into a volatile store such as the RAM 106. Other software components can also be included, as is well known to those skilled in the art.

The subset of software applications 136 that control basic device operations, including data and voice communication applications are installed on the portable electronic device 100 during its manufacture. Other software applications include a message application 138 that can be any suitable software program that allows a user of the portable electronic device 100 to send and receive electronic messages. Various alternatives exist for the message application 138 as is well known to those skilled in the art. Messages that have been sent or received by the user are typically stored in the flash memory 108 of the portable electronic device 100 or some other suitable storage element in the portable electronic device 100. In at least some embodiments, some of the sent and received messages may be stored remotely from the device 100 such as in a data store of an associated host system that the portable electronic device 100 communicates with.

The software applications can further include a device state module 140, a Personal Information Manager (PIM) 142, and other suitable modules (not shown). The device state module 140 provides persistence, i.e. the device state module 140 ensures that important device data is stored in persistent memory, such as the flash memory 108, so that the data is not lost when the portable electronic device 100 is turned off or loses power.

The PIM 142 includes functionality for organizing and managing data items of interest to the user, such as, but not limited to, e-mail, contacts, calendar events, voice mails, appointments, and task items. PIM applications include, for example, calendar, address book, tasks and memo applications. The PIM applications have the ability to send and receive data items via the wireless network 200. PIM data items may be seamlessly integrated, synchronized, and updated via the wireless network 200 with the portable electronic device subscriber's corresponding data items stored and/or associated with a host computer system. This functionality creates a mirrored host computer on the portable electronic device 100 with respect to such items. This can be particularly advantageous when the host computer system is the portable electronic device subscriber's office computer system.

The portable electronic device 100 also includes a connect module 144, and an information technology (IT) policy module 146. The connect module 144 implements the communication protocols that are required for the portable electronic device 100 to communicate with the wireless infrastructure and any host system, such as an enterprise system, that the portable electronic device 100 is authorized to interface with. Examples of a wireless infrastructure and an enterprise system are given in FIGS. 3 and 4, which are described in more detail below.

The connect module 144 includes a set of APIs that can be integrated with the portable electronic device 100 to allow the portable electronic device 100 to use any number of services associated with the enterprise system. The connect module 144 allows the portable electronic device 100 to establish an end-to-end secure, authenticated communication pipe with the host system. A subset of applications for which access is provided by the connect module 144 can be used to pass IT policy commands from the host system to the portable electronic device 100. This can be done in a wireless or wired manner. These instructions can then be passed to the IT policy module 146 to modify the configuration of the device 100. Alternatively, in some cases, the IT policy update can also be done over a wired connection.

Other types of software applications can also be provided on the portable electronic device 100 and still others can be installed on the portable electronic device 100. Such software applications can be third party applications, which are added after the manufacture of the portable electronic device 100. Examples of third party applications include games, calculators, utilities, etc.

The additional applications can be loaded onto the portable electronic device 100 through at least one of the wireless network 200, the auxiliary I/O subsystem 112, the data port 114, the short-range communications subsystem 122, or any other suitable device subsystem 124. This flexibility in application installation increases the functionality of the portable electronic device 100 and may provide enhanced on-device functions, communication-related functions, or both. For example, secure communication applications may enable electronic commerce functions and other such financial transactions to be performed using the portable electronic device 100.

The data port 114 enables a subscriber to set preferences through an external device or software application and extends the capabilities of the portable electronic device 100 by providing for information or software downloads to the portable electronic device 100 other than through a wireless communication network. The alternate download path may, for example, be used to load an encryption key onto the portable electronic device 100 through a direct and thus reliable and trusted connection to provide secure device communication.

The data port 114 can be any suitable port that enables data communication between the portable electronic device 100 and another computing device. The data port 114 can be a serial or a parallel port. In some instances, the data port 114 can be a USB port that includes data lines for data transfer and a supply line that can provide a charging current to charge the battery 130 of the portable electronic device 100.

The short-range communications subsystem 122 provides for communication between the portable electronic device 100 and different systems or devices, without the use of the wireless network 200. For example, the subsystem 122 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an e-mail message, Web page download, or any other information is processed by the communication subsystem 104 and input to the main processor 102. The main processor 102, in conjunction with a rendering engine 105, which can be provided in hardware, software or a combination thereof, will then process the received signal for output to the display 110 or alternatively to the auxiliary I/O subsystem 112. A subscriber may also compose data items, such as e-mail messages, for example, using the keyboard 116 in conjunction with the display 110 and possibly the auxiliary I/O subsystem 112. The auxiliary subsystem 112 may include devices such as: a touch screen, mouse, track ball, infrared fingerprint detector, or a roller wheel with dynamic button pressing capability. The keyboard 116 is preferably an alphanumeric keyboard and/or telephone-type keypad. However, other types of keyboards may also be used. A composed item may be transmitted over the wireless network 200 through the communication subsystem 104.

For voice communications, the overall operation of the portable electronic device 100 is substantially similar, except that the received signals are output to the speaker 118, and signals for transmission are generated by the microphone 120. Alternative voice or audio I/O subsystems, such as a voice message recording subsystem, can also be implemented on the portable electronic device 100. Although voice or audio signal output is accomplished primarily through the speaker 118, the display 110 can also be used to provide additional information such as the identity of a calling party, duration of a voice call, or other voice call related information.

Figure 2:
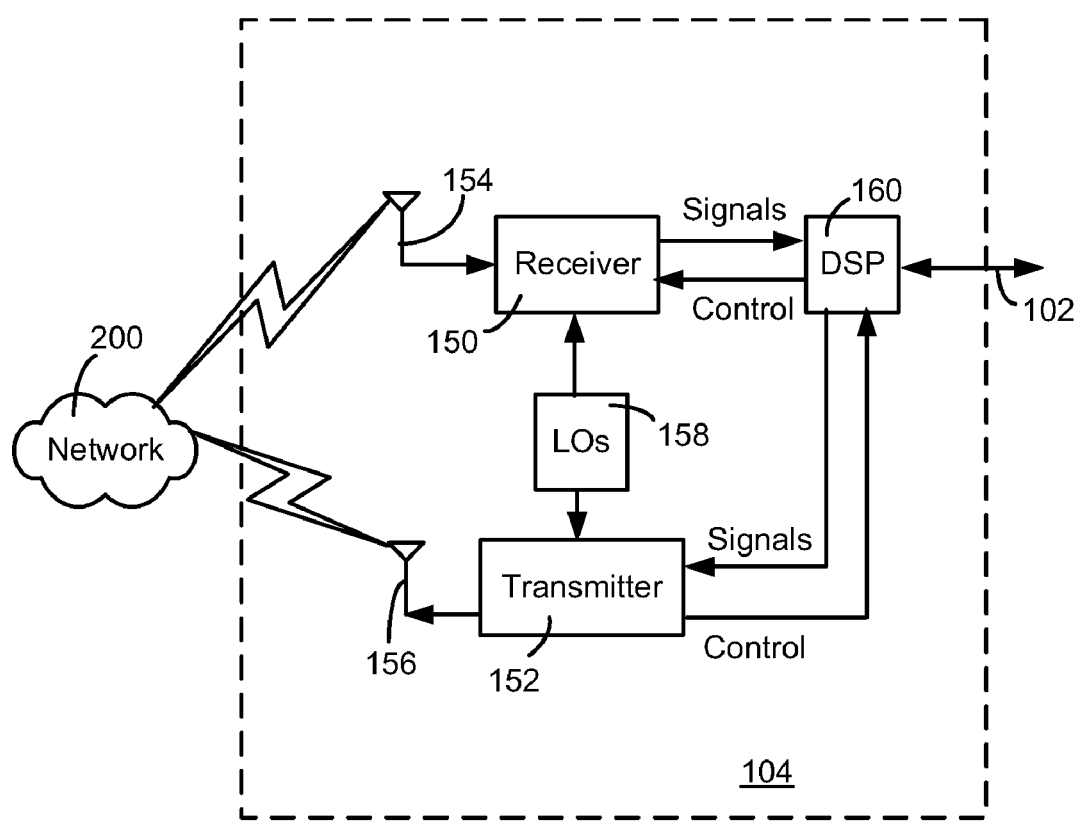
FIG. 2 is an exemplary block diagram of a communication subsystem component of FIG. 1.

Referring now to FIG. 2, an exemplary block diagram of the communication subsystem component 104 is shown. The communication subsystem 104 includes a receiver 150, a transmitter 152, as well as associated components such as one or more embedded or internal antenna elements 154 and 156, Local Oscillators (LOs) 158, and a processing module such as a Digital Signal Processor (DSP) 160. The particular design of the communication subsystem 104 is dependent upon the communication network 200 with which the portable electronic device 100 is intended to operate. Thus, it should be understood that the design illustrated in FIG. 2 serves only as one example.

Signals received by the antenna 154 through the wireless network 200 are input to the receiver 150, which may perform such common receiver functions as signal amplification, frequency down conversion, filtering, channel selection, and analog-to-digital (A/D) conversion. ND conversion of a received signal allows more complex communication functions such as demodulation and decoding to be performed in the DSP 160. In a similar manner, signals to be transmitted are processed, including modulation and encoding, by the DSP 160. These DSP-processed signals are input to the transmitter 152 for digital-to-analog (D/A) conversion, frequency up conversion, filtering, amplification and transmission over the wireless network 200 via the antenna 156. The DSP 160 not only processes communication signals, but also provides for receiver and transmitter control. For example, the gains applied to communication signals in the receiver 150 and the transmitter 152 may be adaptively controlled through automatic gain control algorithms implemented in the DSP 160.

The wireless link between the portable electronic device 100 and the wireless network 200 can contain one or more different channels, typically different RF channels, and associated protocols used between the portable electronic device 100 and the wireless network 200. An RF channel is a limited resource that should be conserved, typically due to limits in overall bandwidth and limited battery power of the portable electronic device 100.

When the portable electronic device 100 is fully operational, the transmitter 152 is typically keyed or turned on only when it is transmitting to the wireless network 200 and is otherwise turned off to conserve resources. Similarly, the receiver 150 is periodically turned off to conserve power until it is needed to receive signals or information (if at all) during designated time periods.

Figure 3:
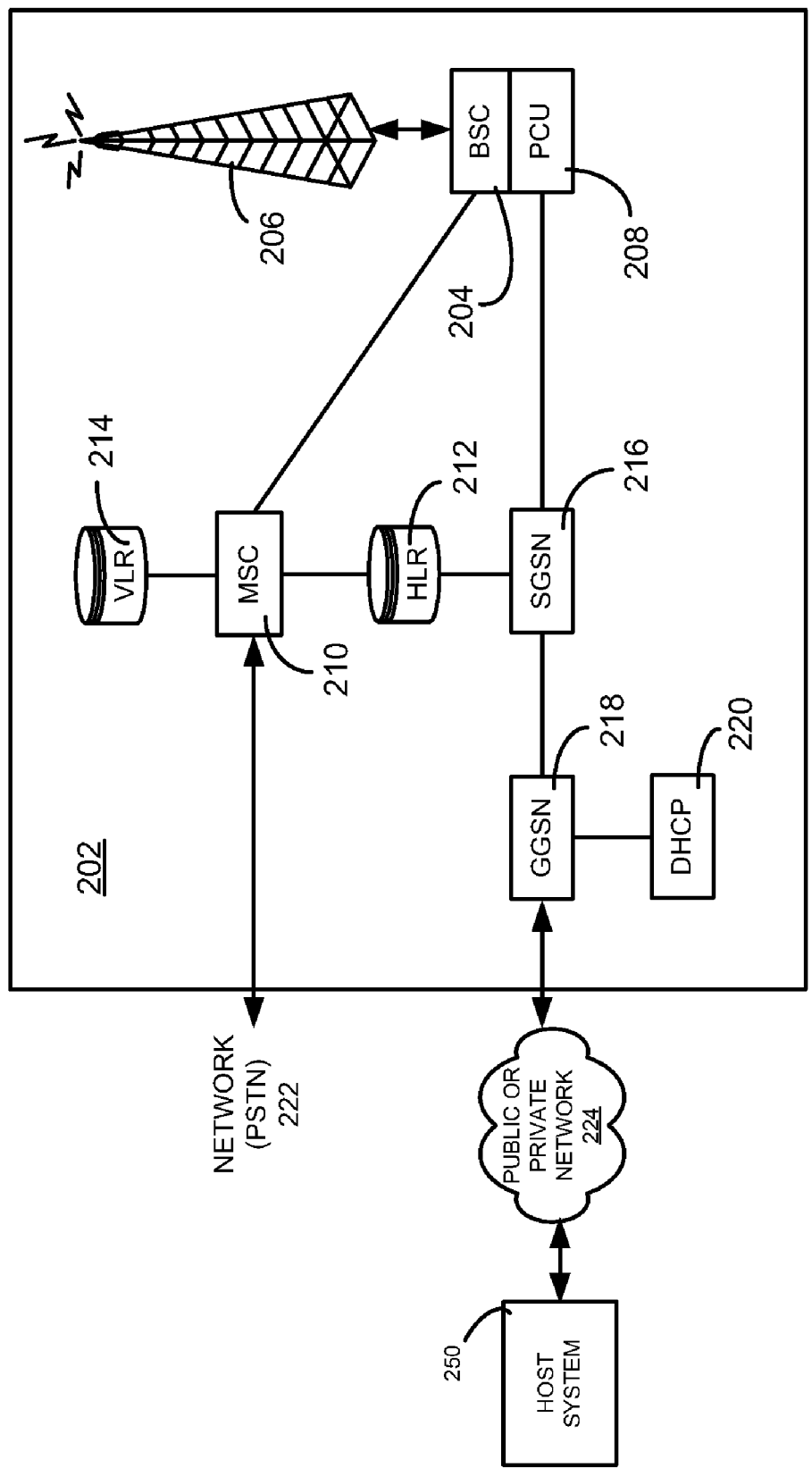
FIG. 3 is a block diagram of an exemplary implementation of a node of a wireless network.

Referring now to FIG. 3, a block diagram of an exemplary implementation of a node 202 of the wireless network 200 is shown. In practice, the wireless network 200 comprises one or more nodes 202. In conjunction with the connect module 144, the portable electronic device 100 can communicate with the node 202 within the wireless network 200. In the exemplary implementation of FIG. 3, the node 202 is configured in accordance with General Packet Radio Service (GPRS) and Global Systems for Mobile (GSM) technologies. The node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through the network 200.

In a GSM network, the MSC 210 is coupled to the BSC 204 and to a landline network, such as a Public Switched Telephone Network (PSTN) 222 to satisfy circuit switched requirements. The connection through the PCU 208, the SGSN 216 and the GGSN 218 to a public or private network (Internet) 224 (also referred to herein generally as a shared network infrastructure) represents the data path for GPRS capable portable electronic devices. In a GSM network extended with GPRS capabilities, the BSC 204 also contains the Packet Control Unit (PCU) 208 that connects to the SGSN 216 to control segmentation, radio channel allocation and to satisfy packet switched requirements. To track the location of the portable electronic device 100 and availability for both circuit switched and packet switched management, the HLR 212 is shared between the MSC 210 and the SGSN 216. Access to the VLR 214 is controlled by the MSC 210.

The station 206 is a fixed transceiver station and together with the BSC 204 form fixed transceiver equipment. The fixed transceiver equipment provides wireless network coverage for a particular coverage area commonly referred to as a "cell". The fixed transceiver equipment transmits communication signals to and receives communication signals from portable electronic devices within its cell via the station 206. The fixed transceiver equipment normally performs such functions as modulation and possibly encoding and/or encryption of signals to be transmitted to the portable electronic device 100 in accordance with particular, usually predetermined, communication protocols and parameters, under control of its controller. The fixed transceiver equipment similarly demodulates and possibly decodes and decrypts, if necessary, any communication signals received from the portable electronic device 100 within its cell. Communication protocols and parameters may vary between different nodes. For example, one node may employ a different modulation scheme and operate at different frequencies than other nodes.

For all portable electronic devices 100 registered with a specific network, permanent configuration data such as a user profile is stored in the HLR 212. The HLR 212 also contains location information for each registered portable electronic device and can be queried to determine the current location of a portable electronic device. The MSC 210 is responsible for a group of location areas and stores the data of the portable electronic devices currently in its area of responsibility in the VLR 214. Further, the VLR 214 also contains information on portable electronic devices that are visiting other networks. The information in the VLR 214 includes part of the permanent portable electronic device data transmitted from the HLR 212 to the VLR 214 for faster access. By moving additional information from a remote HLR 212 node to the VLR 214, the amount of traffic between these nodes can be reduced so that voice and data services can be provided with faster response times and at the same time requiring less use of computing resources.

The SGSN 216 and the GGSN 218 are elements added for GPRS support; namely packet switched data support, within GSM. The SGSN 216 and the MSC 210 have similar responsibilities within the wireless network 200 by keeping track of the location of each portable electronic device 100. The SGSN 216 also performs security functions and access control for data traffic on the wireless network 200. The GGSN 218 provides internetworking connections with external packet switched networks and connects to one or more SGSN's 216 via an Internet Protocol (IP) backbone network operated within the network 200. During normal operations, a given portable electronic device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring the DHCP server 220 connected to the GGSN 218. There are many mechanisms for dynamic IP assignment, including using a combination of a Remote Authentication Dial-In User Service (RADIUS) server and a DHCP server. Once the GPRS Attach is complete, a logical connection is established from a portable electronic device 100, through the PCU 208, and the SGSN 216 to an Access Point Node (APN) within the GGSN 218. The APN represents a logical end of an IP tunnel that can either access direct Internet compatible services or private network connections. The APN also represents a security mechanism for the network 200, insofar as each portable electronic device 100 must be assigned to one or more APNs and portable electronic devices 100 cannot exchange data without first performing a GPRS Attach to an APN that it has been authorized to use. The APN may be considered to be similar to an Internet domain name such as "myconnection-.wireless.com".

Once the GPRS Attach operation is complete, a tunnel is created and all traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) Contexts and there are a limited number of these available in the network 200. To maximize use of the PDP Contexts, the network 200 will run an idle timer for each PDP Context to determine if there is a lack of activity. When a portable electronic device 100 is not using its PDP Context, the PDP Context can be de-allocated and the IP address returned to the IP address pool managed by the DHCP server 220.

Figure 4:
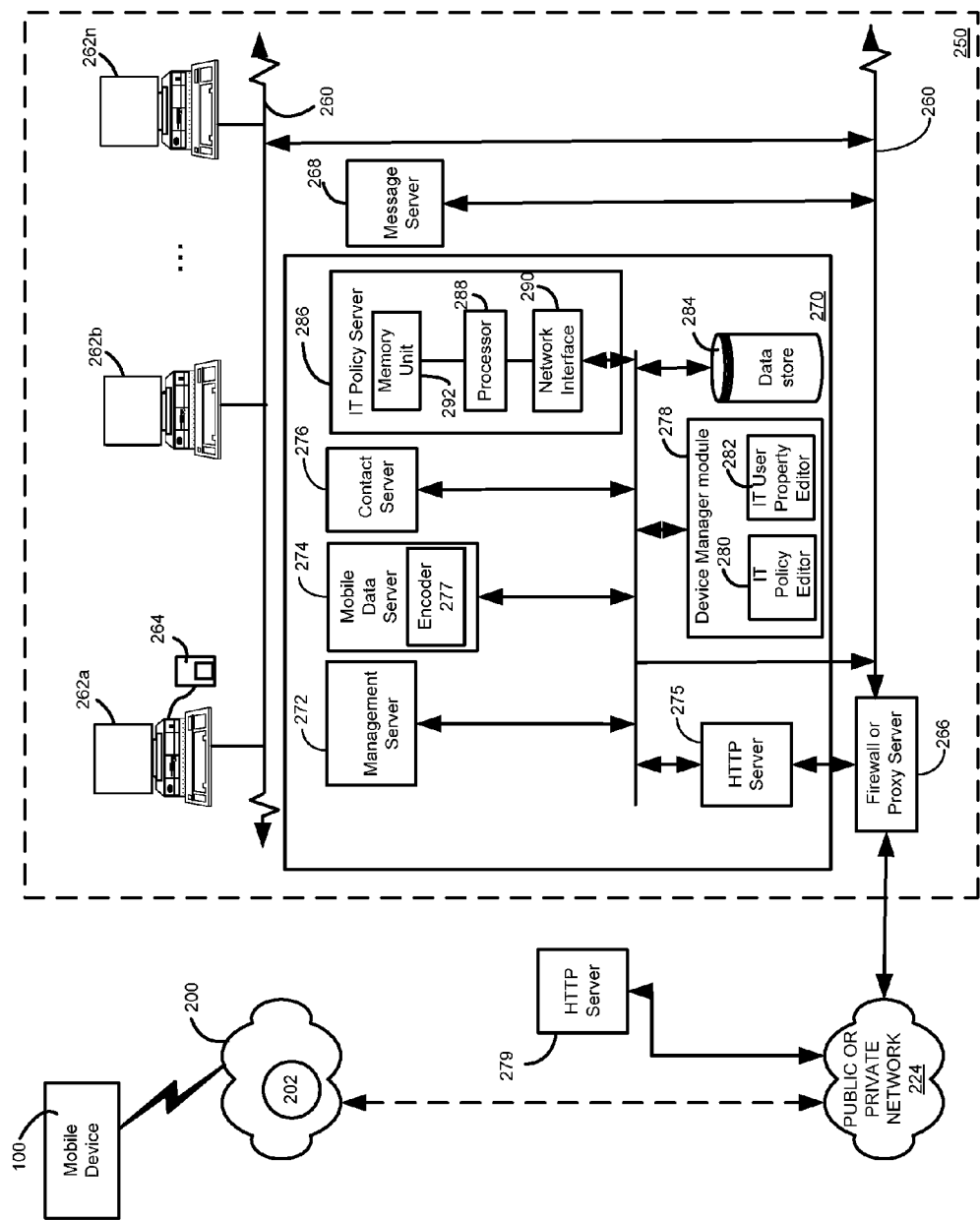

Referring now to FIG. 4, shown therein is a block diagram illustrating components of an exemplary configuration of a host system 250 that the portable electronic device 100 can communicate with in conjunction with the connect module 144. The host system 250 will typically be a corporate enterprise or other local area network (LAN), but may also be a home office computer or some other private system, for example, in variant implementations. In this example shown in FIG. 4, the host system 250 is depicted as a LAN of an organization to which a user of the portable electronic device 100 belongs. Typically, a plurality of portable electronic devices can communicate wirelessly with the host system 250 through one or more nodes 202 of the wireless network 200.

The host system 250 comprises a number of network components connected to each other by a network 260. For instance, a user's desktop computer 262a with an accompanying cradle 264 for the user's portable electronic device 100 is situated on a LAN connection. The cradle 264 for the portable electronic device 100 can be coupled to the computer 262a by a serial or a Universal Serial Bus (USB) connection, for example. Other user computers 262b-262n are also situated on the network 260, and each may or may not be equipped with an accompanying cradle 264. The cradle 264 facilitates the loading of information (e.g. PIM data, private symmetric encryption keys to facilitate secure communications) from the user computer 262a to the portable electronic device 100, and may be particularly useful for bulk information updates often performed in initializing the portable electronic device 100 for use. The information downloaded to the portable electronic device 100 may include certificates used in the exchange of messages.

It will be understood by persons skilled in the art that the user computers 262a-262n will typically also be connected to other peripheral devices, such as printers, etc. which are not explicitly shown in FIG. 4. Furthermore, only a subset of network components of the host system 250 are shown in FIG. 4 for ease of exposition, and it will be understood by persons skilled in the art that the host system 250 will comprise additional components that are not explicitly shown in FIG. 4 for this exemplary configuration. More generally, the host system 250 may represent a smaller part of a larger network (not shown) of the organization, and may comprise different components and/or be arranged in different topologies than that shown in the exemplary embodiment of FIG. 4.

To facilitate the operation of the portable electronic device 100 and the wireless communication of messages and message-related data between the portable electronic device 100 and components of the host system 250, a number of wireless communication support components 270 can be provided. In some implementations, the wireless communication support components 270 can include a management server 272, a mobile data server (MDS) 274, a web server, such as Hypertext Transfer Protocol (HTTP) server 275, a contact server 276, and a device manager module 278. HTTP servers can also be located outside the enterprise system, as indicated by the HTTP server 275 attached to the network 224. The device manager module 278 includes an IT Policy editor 280 and an IT user property editor 282, as well as other software components for allowing an IT administrator to configure the portable electronic devices 100. In an alternative embodiment, there may be one editor that provides the functionality of both the IT policy editor 280 and the IT user property editor 282. The support components 270 also include a data store 284, and an IT policy server 286. The IT policy server 286 includes a processor 288, a network interface 290 and a memory unit 292. The processor 288 controls the operation of the IT policy server 286 and executes functions related to the standardized IT policy as described below. The network interface 290 allows the IT policy server 286 to communicate with the various components of the host system 250 and the portable electronic devices 100. The memory unit 292 can store functions used in implementing the IT policy as well as related data. Those skilled in the art know how to implement these various components. Other components may also be included as is well known to those skilled in the art. Further, in some implementations, the data store 284 can be part of any one of the servers.

In this exemplary embodiment, the portable electronic device 100 communicates with the host system 250 through node 202 of the wireless network 200 and a shared network infrastructure 224 such as a service provider network or the public Internet. Access to the host system 250 may be provided through one or more routers (not shown), and computing devices of the host system 250 may operate from behind a firewall or proxy server 266. The proxy server 266 provides a secure node and a wireless internet gateway for the host system 250. The proxy server 266 intelligently routes data to the correct destination server within the host system 250.

In some implementations, the host system 250 can include a wireless VPN router (not shown) to facilitate data exchange between the host system 250 and the portable electronic device 100. The wireless VPN router allows a VPN connection to be established directly through a specific wireless network to the portable electronic device 100. The wireless VPN router can be used with the Internet Protocol (IP) Version 6 (IPV6) and IP-based wireless networks. This protocol can provide enough IP addresses so that each portable electronic device has a dedicated IP address, making it possible to push information to a portable electronic device at any time. An advantage of using a wireless VPN router is that it can be an off-the-shelf VPN component, and does not require a separate wireless gateway and separate wireless infrastructure. A VPN connection can preferably be a Transmission Control Protocol (TCP)/IP or User Datagram Protocol (UDP)/IP connection for delivering the messages directly to the portable electronic device 100 in this alternative implementation.

Messages intended for a user of the portable electronic device 100 are initially received by a message server 268 of the host system 250. Such messages may originate from any number of sources. For instance, a message may have been sent by a sender from the computer 262b within the host system 250, from a different portable electronic device (not shown) connected to the wireless network 200 or a different wireless network, or from a different computing device, or other device capable of sending messages, via the shared network infrastructure 224, possibly through an application service provider (ASP) or Internet service provider (ISP), for example.

The message server 268 typically acts as the primary interface for the exchange of messages, particularly e-mail messages, within the organization and over the shared network infrastructure 224. Each user in the organization that has been set up to send and receive messages is typically associated with a user account managed by the message server 268. Some exemplary implementations of the message server 268 include a Microsoft Exchange™ server, a Lotus Domino™ server, a Novell Groupwise™ server, or another suitable mail server installed in a corporate environment. In some implementations, the host system 250 may comprise multiple message servers 268. The message server provides additional functions including PIM functions such as calendaring, contacts and tasks and supports data storage.

When messages are received by the message server 268, they are typically stored in a data store associated with the message server 268. In at least some embodiments, the data store may be a separate hardware unit, such as data store 284, that the message server 268 communicates with. Messages can be subsequently retrieved and delivered to users by accessing the message server 268. For instance, an e-mail client application operating on a user's computer 262a may request the e-mail messages associated with that user's account stored on the data store associated with the message server 268. These messages are then retrieved from the data store and stored locally on the computer 262a. The data store associated with the message server 268 can store copies of each message that is locally stored on the portable electronic device 100. Alternatively, the data store associated with the message server 268 can store all of the messages for the user of the portable electronic device 100 and only a smaller number of messages can be stored on the portable electronic device 100 to conserve memory. For instance, the most recent messages (i.e. those received in the past two to three months for example) can be stored on the portable electronic device 100.

When operating the portable electronic device 100, the user may wish to have e-mail messages retrieved for delivery to the portable electronic device 100. The message application 138 operating on the portable electronic device 100 may also request messages associated with the user's account from the message server 268. The message application 138 may be configured (either by the user or by an administrator, possibly in accordance with an organization's IT policy) to make this request at the direction of the user, at some pre-defined time interval, or upon the occurrence of some pre-defined event. In some implementations, the portable electronic device 100 is assigned its own e-mail address, and messages addressed specifically to the portable electronic device 100 are automatically redirected to the portable electronic device 100 as they are received by the message server 268.

The management server 272 can be used to specifically provide support for the management of, for example, messages, such as e-mail messages, that are to be handled by portable electronic devices. Generally, while messages are still stored on the message server 268, the management server 272 can be used to control when, if, and how messages are sent to the portable electronic device 100. The management server 272 also facilitates the handling of messages composed on the portable electronic device 100, which are sent to the message server 268 for subsequent delivery.

For example, the management server 272 may monitor the user's "mailbox" (e.g. the message store associated with the user's account on the message server 268) for new e-mail messages, and apply user-definable filters to new messages to determine if and how the messages are relayed to the user's portable electronic device 100. The management server 272 may also, through an encoder 273, compress messages, using any suitable compression technology (e.g. YK compression, and other known techniques) and encrypt messages (e.g. using an encryption technique such as Data Encryption Standard (DES), Triple DES, or Advanced Encryption Standard (AES)), and push them to the portable electronic device 100 via the shared network infrastructure 224 and the wireless network 200. The management server 272 may also receive messages composed on the portable electronic device 100 (e.g. encrypted using Triple DES), decrypt and decompress the composed messages, re-format the composed messages if desired so that they will appear to have originated from the user's computer 262a, and re-route the composed messages to the message server 268 for delivery.

Certain properties or restrictions associated with messages that are to be sent from and/or received by the portable electronic device 100 can be defined (e.g. by an administrator in accordance with IT policy) and enforced by the management server 272. These may include whether the portable electronic device 100 may receive encrypted and/or signed messages, minimum encryption key sizes, whether outgoing messages must be encrypted and/or signed, and whether copies of all secure messages sent from the portable electronic device 100 are to be sent to a pre-defined copy address, for example.

The management server 272 may also be adapted to provide other control functions, such as only pushing certain message information or pre-defined portions (e.g. "blocks") of a message stored on the message server 268 to the portable electronic device 100. For example, in some cases, when a message is initially retrieved by the portable electronic device 100 from the message server 268, the management server 272 may push only the first part of a message to the portable electronic device 100, with the part being of a pre-defined size (e.g. 2 KB). The user can then request that more of the message be delivered in similar-sized blocks by the management server 272 to the portable electronic device 100, possibly up to a maximum pre-defined message size. Accordingly, the management server 272 facilitates better control over the type of data and the amount of data that is communicated to the portable electronic device 100, and can help to minimize potential waste of bandwidth or other resources.

The MDS 274 encompasses any other server that stores information that is relevant to the corporation. The mobile data server 274 may include, but is not limited to, databases, online data document repositories, customer relationship management (CRM) systems, or enterprise resource planning (ERP) applications. The MDS 274 can also connect to the Internet or other public network, through HTTP server 275 or other suitable web server such as an File Transfer Protocol (FTP) server, to retrieve HTTP webpages and other data. Requests for webpages are typically routed through MDS 274 and then to HTTP server 275, through suitable firewalls and other protective mechanisms. The web server then retrieves the webpage over the Internet, and returns it to MDS 274. As described above in relation to management server 272, MDS 274 is typically provided, or associated, with an encoder 277 that permits retrieved data, such as retrieved webpages, to be compressed, using any suitable compression technology (e.g. YK compression, and other known techniques), and encrypted (e.g. using an encryption technique such as DES, Triple DES, or AES), and then pushed to the portable electronic device 100 via the shared network infrastructure 224 and the wireless network 200.

The contact server 276 can provide information for a list of contacts for the user in a similar fashion as the address book on the portable electronic device 100. Accordingly, for a given contact, the contact server 276 can include the name, phone number, work address and e-mail address of the contact, among other information. The contact server 276 can also provide a global address list that contains the contact information for all of the contacts associated with the host system 250.

It will be understood by persons skilled in the art that the management server 272, the MDS 274, the HTTP server 275, the contact server 276, the device manager module 278, the data store 284 and the IT policy server 286 do not need to be implemented on separate physical servers within the host system 250. For example, some or all of the functions associated with the management server 272 may be integrated with the message server 268, or some other server in the host system 250. Alternatively, the host system 250 may comprise multiple management servers 272, particularly in variant implementations where a large number of portable electronic devices need to be supported.

The device manager module 278 provides an IT administrator with a graphical user interface with which the IT administrator interacts to configure various settings for the portable electronic devices 100. As mentioned, the IT administrator can use IT policy rules to define behaviors of certain applications on the portable electronic device 100 that are permitted such as phone, web browser or Instant Messenger use. The IT policy rules can also be used to set specific values for configuration settings that an organization requires on the portable electronic devices 100 such as auto signature text, WLAN/VoIP/VPN configuration, security requirements (e.g. encryption algorithms, password rules, etc.), specifying themes or applications that are allowed to run on the portable electronic device 100, and the like.

As indicated above, the portable electronic device 100 includes the Personal Information Manager (PIM) 142 that includes functionality for organizing and managing data items of interest to the user, such as, but not limited to, e-mail, contacts, calendar events, voice mails, appointments, and task items. PIM applications include, for example, calendar, address book, tasks and memo applications.

The graphics in an application such as a map application are represented as polygons and line segments. These are rendered onto the screen with different colors and stroking schemes to display a geographic location. In such applications, a user generally pans (horizontal and/or vertical translational movement) through a vast 2-dimensional (2D) space containing the polygons and line segments or portions thereof. As the underlying line segments, manifested as streets, roads and highways in a map application do not change with the user pan, the present method focuses on rendering only the newly exposed, or "clipped", portions.

Figure 5:
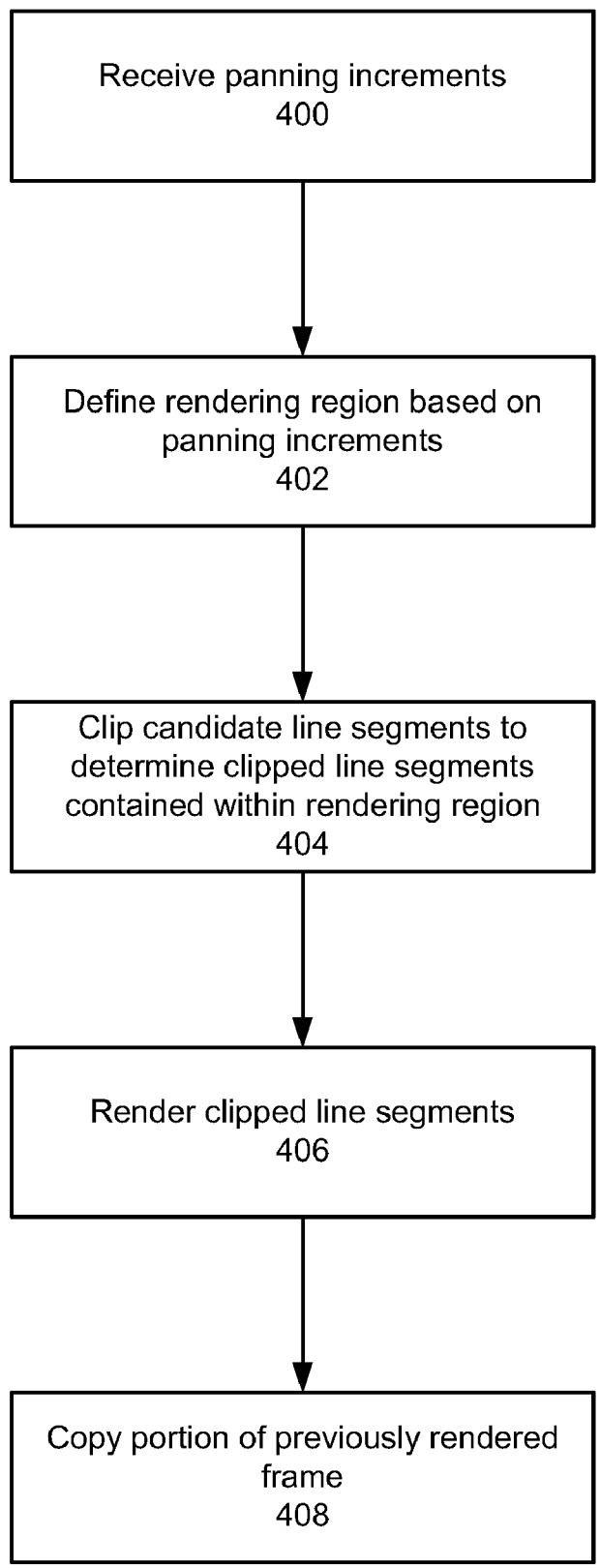
FIG. 5 is a flowchart of an exemplary method.

FIG. 5 is a flowchart of the present method. Generally, the present method provides a method of static graphics rendering in a mobile device. As used herein, a "static" rendering application is defined as a rendering application with no animation content in the rendered scene, such as map and other geographical display applications. In other words, the rendered scene is relatively static from one image frame to the next frame, and there are no moving objects in the scene. Panning increments are received for panning a previously rendered frame to a panned frame (step 400). As used herein, "panning" refers to the action of scanning across an image on a display of the mobile device 100. Panning across an image results in translation of the image in the horizontal and/or vertical directions, and may result in the display of previously hidden portions of the image. "Panning increments" refer to the incremental changes in the horizontal and/or vertical coordinates of the image resulting from the panning operation.

A rendering region is then defined based on the panning increments (step 402). The "rendering region" is a generally L-shaped region in the 2D plane, also referred to herein as the L-region, that includes only the portion of the image that was previously unrendered. The L-shaped region has inner horizontal and vertical boundaries that are collinear with respective horizontal and vertical boundaries of the previously rendered frame and outer boundaries collinear with respective horizontal and vertical boundaries of the panned frame. A candidate line segment or polyline is then clipped against the L-shaped rendering region to create clipped line segments contained within the rendering region (step 404). As used herein, a "polyline" is a series of connected line or arc segments. The clipped line segments can then be rendered (step 406), and a portion of the previously rendered frame can be copied (step 408), to provide the panned frame. The method can be performed by the rendering engine 105, shown in FIG. 1. Rendering speeds can be improved by up to 6 to 8 times when compared to systems not using this technique.

Embodiments of the present method can be represented as a software product stored in a machine-readable medium (also referred to as a computer-readable medium, a processor-readable medium, or a computer usable medium having a computer-readable program code embodied therein). The machine-readable medium can be any suitable tangible medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention can also be stored on the machine-readable medium. Software running from the machine-readable medium can interface with circuitry to perform the described tasks.

Figure 6:
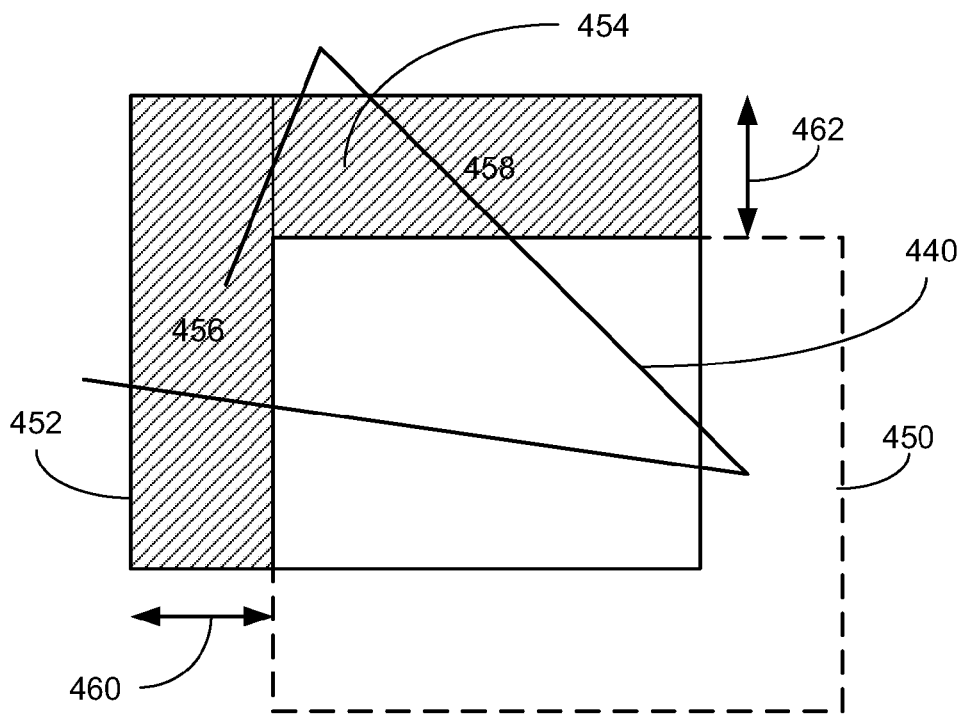
FIG. 6 illustrates a panning operation.

Embodiments of the present method will now be described with reference to FIGS. 6-10. FIG. 6 shows a candidate polyline 440 over which a user can pan a frame. The panning operation results in a previously rendered frame 450 being shifted to a desired new view, as indicated by the panned frame 452. The panning operation can consist of a vertical pan, followed optionally by a horizontal pan, or vice versa, or can consist of simultaneous movement in both horizontal and vertical directions. A resultant rendering region, shown as shaded L-region 454, is defined by the panning operation.

The L-region 454 is by definition two rectangles, as shown, that combine to give the shape of an "L" on the screen. Each rectangle 456, 458 represents a refresh region of the screen display, and is defined by the horizontal and vertical panning increments, indicated by the arrows 460 and 462.

Figure 7:
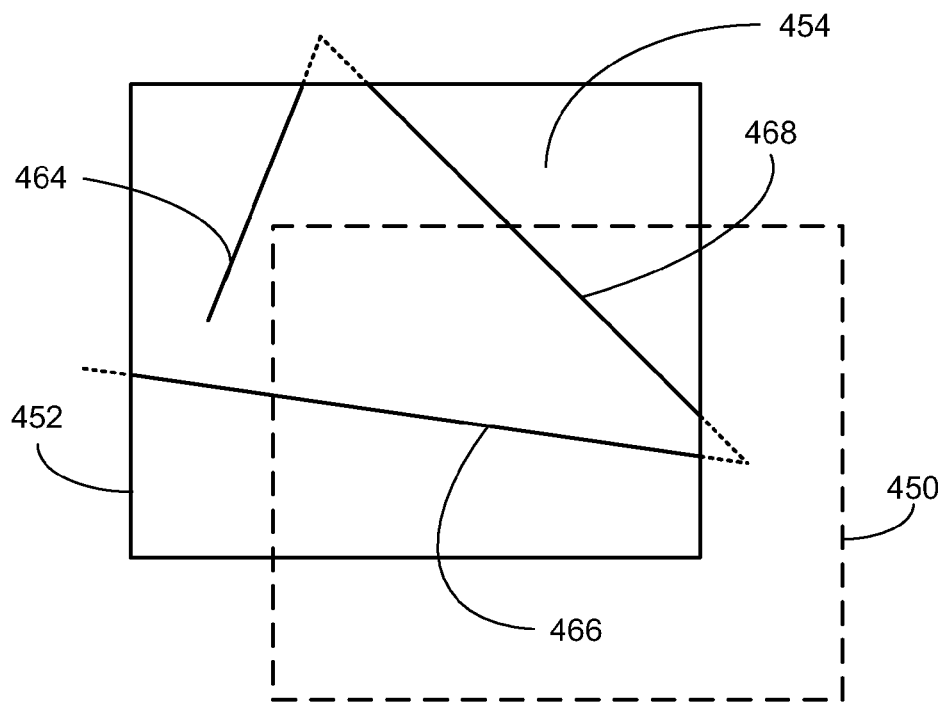
FIG. 7 illustrates rectangular clipping of a polyline.

Once the user performs the panning operation, the horizontal and vertical panning increments are captured or received, and are used to compute the L-region 454, which represents the effective refresh region on the screen. To clip the polyline 440 in accordance with the L-region 454, a conventional line clipping method, such as the Cohen-Sutherland method, is applied to the polyline 440 of FIG. 6. This step is illustrated in FIG. 7, where the boundaries of the panned frame 452 define the rectangular clipping window used in the line clipping operation. It should also be noted that the bounds of the rectangular clipping window conform to the outer edges of the L-region 454. The clipped line segments resulting from the clipping operation is shown by the clipped line segments 464, 466, 468.

Figure 8:
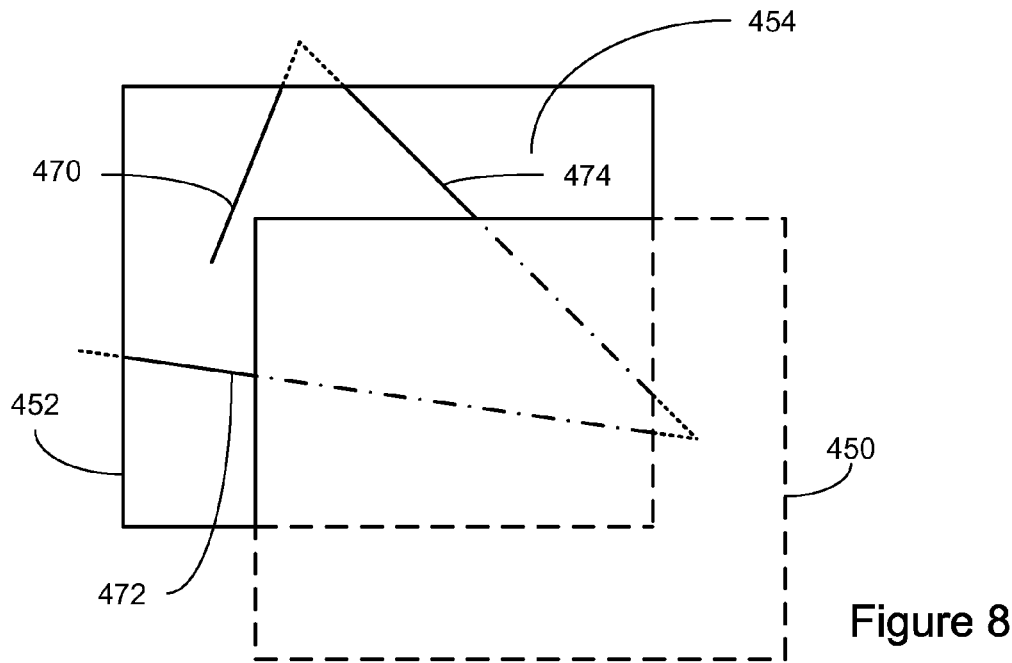
FIGS. 8-10 illustrate clipping a polyline against an L-shaped region.

Once the polyline 440 is clipped to the rectangular region 452, the resulting clipped line segments 464, 466, 468 are in turn each clipped against the L-region 454 to compute a set of L-region clipped line segments 470, 472, 474, as shown in FIG. 8. The L-region clipped line segments 470, 472, 474 represent the minimum number of screen pixels requiring a refresh to view the polyline 440 in the panned frame 452. As will be appreciated, once the set of L-region clipped line segments 470, 472, 474 has been rendered, the remainder of screen bitmap can be derived or copied from the previously rendered frame 450, and can be used to fill in the region of the panned frame that is outside the L-region 454. This in effect reduces the total rendering needs of the refresh operation to just the L-region 454.

Figure 9:
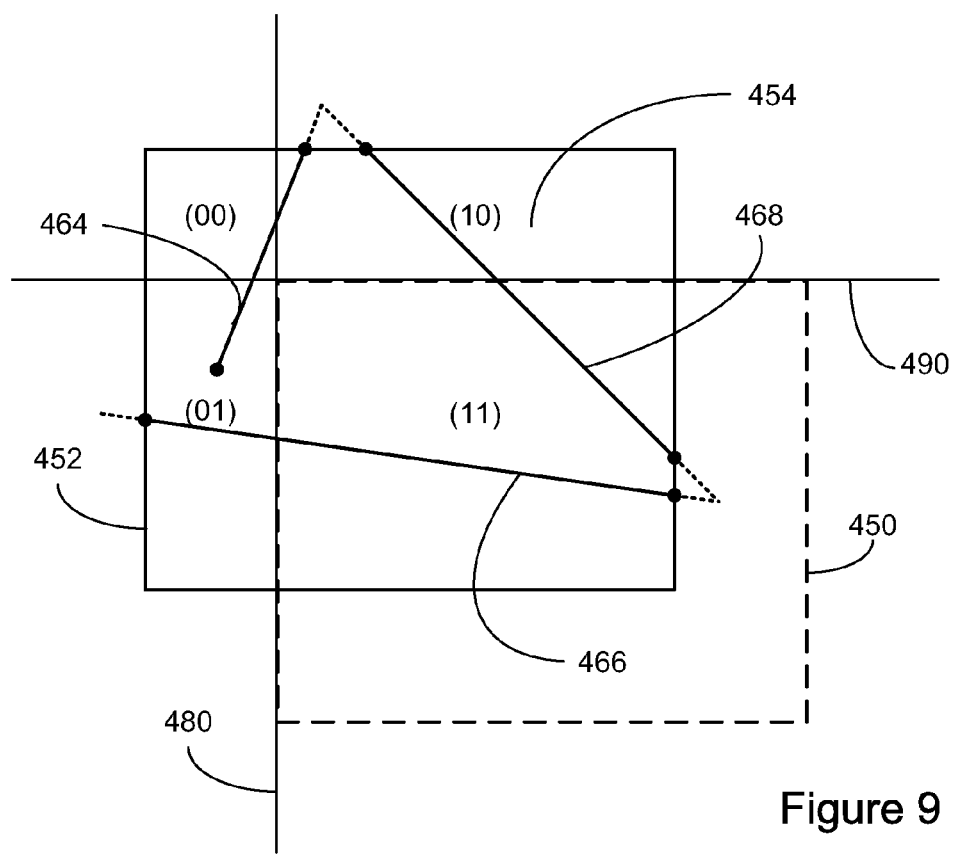
Figure 10:
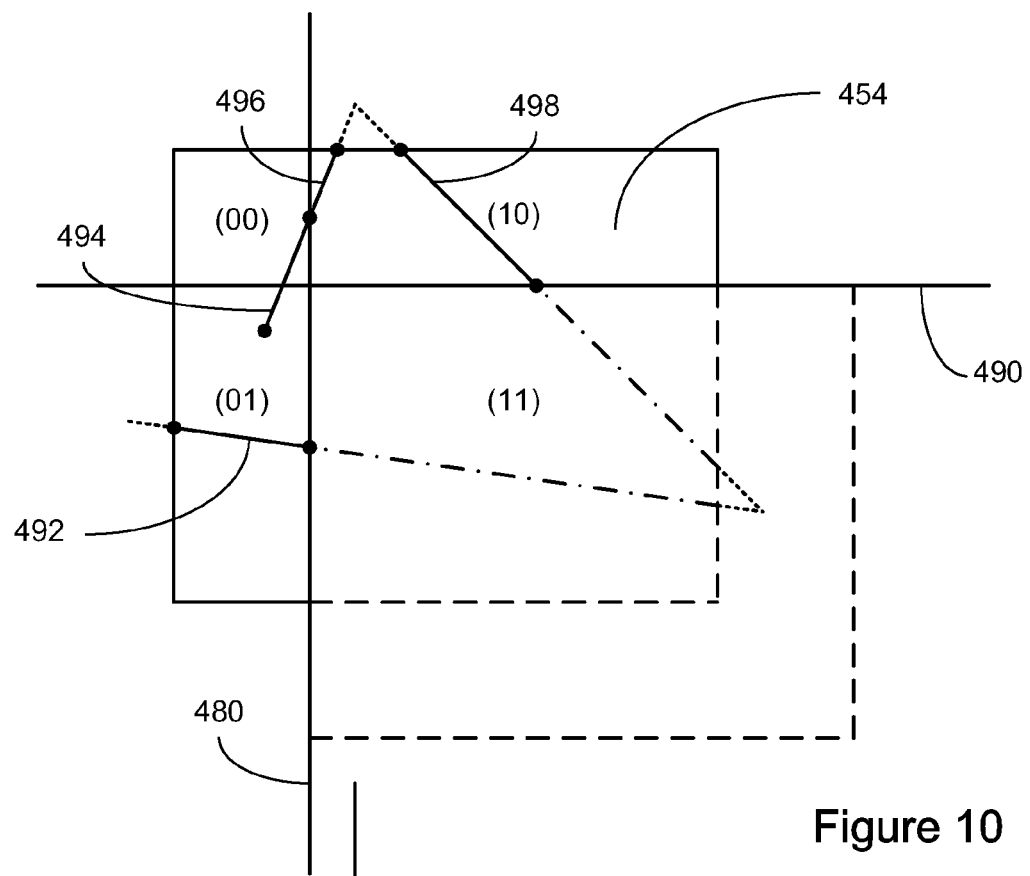

One embodiment for clipping the line segments 464, 466, 468 against the L-region 454 will now be described with reference to FIGS. 9 and 10. For clipping line segments 464, 466, 468 to the L-region 454, the 2D plane is first divided into four quadrants, and codes are assigned to each quadrant. A code is then computed for each end point of the candidate line segments 464, 466, 468. The computed codes permit each line segment 464, 466, 468 to be categorized as line segments intersecting with the L-region boundaries; completely within the L-region boundaries; or completely outside the L-region boundaries. Line segments falling completely within or completely outside the L-region can then be trivially accepted or rejected, respectively, for rendering.

To divide the 2D plane into quadrants or regions, the vertical and horizontal interior line segments 480 and 490 forming the L-region are extended, and codes (00), (01), (11) and (10) are assigned to the respective regions. The first digit in the code represents the vertical component V, and the second digit represents the horizontal component H. The codes are assigned to the regions such that those regions falling within the L-region 454 with respect to the vertical line 480 are assigned a vertical component of "0", and those falling outside the L-region 454 with respect to the vertical line 480 are assigned a vertical component of "1". Similarly, horizontal components of the region codes are assigned such that those regions falling within the L-region 454 with respect to the horizontal line 490 are assigned a horizontal component of "0", and those falling outside the L-region 454 with respect to the horizontal line 490 are assigned a horizontal component of "1".

Codes are then computed for each endpoint of the candidate line segments 464, 466, 468. In the illustrated example shown in FIG. 9, the codes computed for the endpoints of line segment 464, 466, and 468 are [P1(01), P2(10)]; [P1(01), P2(11)] and [P1(10), P2(11)], respectively. Once the VH codes are assigned to all the end points of the candidate line segments, each line segment is examined to first determine if it can be trivially accepted or rejected.

Figure 11:
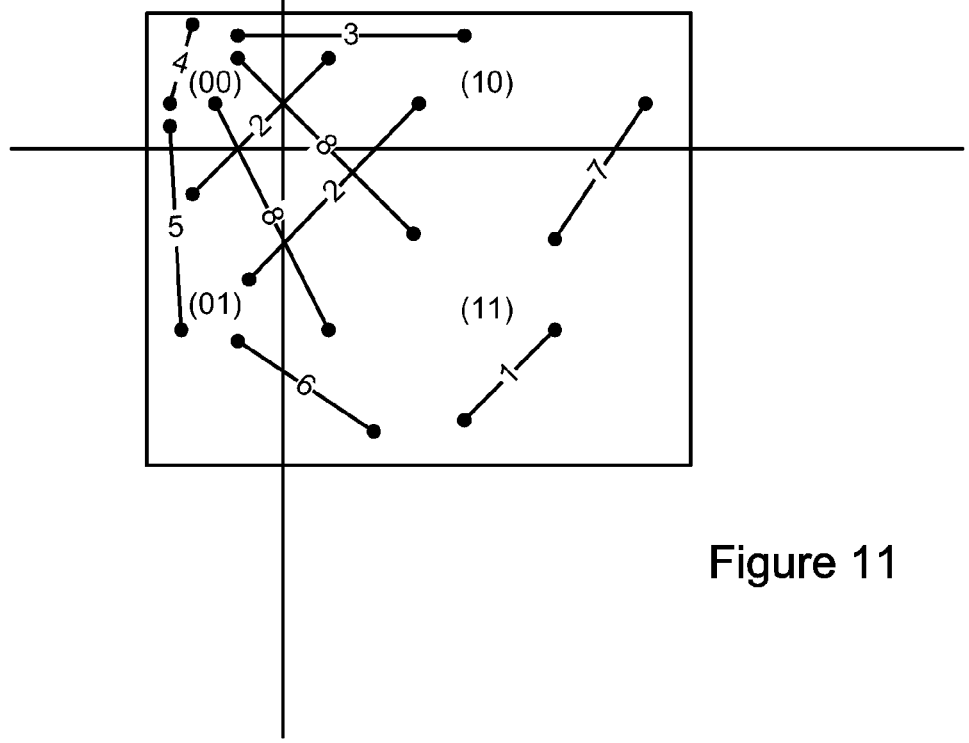
FIG. 11 shows the eight cases into which clipped line segments can fall.

As shown in FIG. 11, there are eight distinct cases for classifying a line segment. Each of these eight cases is shown by its respectively numbered line segment in FIG. 11:

Class 1: P1 (11) and P2 (11). This implies that both the points are outside the LRegion.

Class 2: P1 (01) and P2 (10). This implies that P1 lies outside the horizontal region but inside the vertical region and vice versa for P2. This case has two subcases
  a. The line segment lies completely within the L-region.
  b. The line segment P1P2 intersects the L-region boundaries.

Class 3: P1 (00) and P2 (10). This implies that P1 is inside both the vertical and horizontal regions and P2 inside the horizontal region, which in turn means that the line segment is completely within the L-region.

Class 4: P1 (00) and P2 (00). This implies that both P1 and P2 are inside both the vertical and horizontal regions hence the line segment is also completely within the L-region.

Class 5: P1 (01) and P2 (00). This case is similar to case 3. The line segment is contained completely within the L-region by virtue of the containment of P1 and P2 inside the vertical region.

Class 6: P1 (01) and P2 (11). This case implies that P1 is contained inside the vertical region and P2 outside the L-region and hence the line segment P1P2 intersects the L-region at the vertical boundary.

Class 7: P1 (10) and P2 (11). This case implies that P1 is contained inside the horizontal region and P2 outside the L-region and hence the line segment P1P2 intersects the L-region at the horizontal boundary.

Class 8: P1 (00) and P2 (11). This case implies that P1 is contained inside the horizontal as well as the vertical region and P2 outside both and hence the line segment P1P2 intersects the L-region at either the horizontal or the vertical boundary. This case can also be considered a sub-class of classes 7 and 8.

A line segment classified as belonging Class 1 can be trivially rejected, and line segments classified as belonging to Classes 3, 4 or 5 can be trivially accepted for rendering. Line segments classified in the remaining classes require further processing to determine the portion required to be rendered or refreshed.

As can be seen from the illustrated example, line segments 464, 466, 468 are classified in Classes 2, 6 and 7, respectively. Hence, further clipping operations are performed on the each of the line segments, as shown in FIG. 10. The line segments 464, 466, 468 are first clipped with respect to the vertical line 480 of the L-region. A line segment is said to be clipped with respect to a line when it is split with respect to the line, and the newly created line segments on one side of the line are retained or accepted. Those portions of the line segments 464, 466, 468 that lie on the side of the line 480 within the L-region 454 (i.e. clipped line segments 492 and 494) can be retained or accepted for rendering, and can be rendered immediately without further clipping. Those portions which lie to the other side of the line 490 are further processed by performing another clipping operation with respect to the interior horizontal line 490 of the L-region 454, discarding those newly clipped line segments that fall outside the L-region 454 and retaining or accepting those that fall within the L-region. In the illustrated example, this results in further accepting newly clipped line segments 496 and 498.

The present method permits line segments and polylines to be clipped in very short time when compared to other line clipping methods. The number of final line segments to render is contained within only a fraction of the total geometry that spans the entire display, since the L-region is typically only 10-25% of the total screen area. As the number of line segments grows, the present method can greatly accelerate rendering by restricting the number of pixels needed to be redrawn in any panning operation.

While the embodiments described herein are directed to particular implementations of the electronic device and method of controlling the electronic device, the above-described embodiments are intended to be examples. It will be understood that alterations, modifications and variations may be effected without departing from the scope of the present disclosure.

What is claimed is:

1. A computer-implemented method, comprising:
    determining a rendering region based on panning increments received for panning a previously rendered frame of a static graphic image;
    clipping a candidate segment against the rendering region to obtain at least one clipped segment contained within the rendering region; and
    rendering the at least one clipped segment and copying a portion of the previously rendered frame to provide a panned frame.

2. The method according to claim 1, wherein determining the rendering region comprises determining an L-shaped region having inner horizontal and vertical boundaries collinear with respective horizontal and vertical boundaries of the previously rendered frame and outer boundaries collinear with respective horizontal and vertical boundaries of the panned frame.

3. The method according to claim 2, wherein clipping the candidate segment comprises:
    performing a line clipping operation on the candidate segment, based on a rectangle determined by the horizontal and vertical boundaries of the panned frame to obtain one or more intermediate line segments; and
    clipping the one or more intermediate line segments against the L-shaped rendering region to determine the one or more clipped line segments.

4. The method according to claim 3, wherein clipping the one or more intermediate line segments comprises:
    dividing a 2-dimensional plane containing the candidate segment into four regions with respect to the horizontal and vertical inner boundaries of the L-shaped rendering region;
    determining, for each of the one or more intermediate line segments, if said intermediate line segment is wholly included or wholly excluded, based upon the respective regions in which the endpoints of said intermediate line segment are located; and
    clipping those intermediate line segments that are not wholly included or wholly excluded with respect to at least one of the horizontal and vertical inner boundaries of the L-shaped rendering region.

5. The method according to claim 4, wherein determining, for each of the one or more intermediate line segments, if said intermediate line segment is wholly included or wholly excluded comprises:
    assigning unique codes to each of the four regions;
    assigning one of the unique codes to each end point of the intermediate line segments, based on the region in which the respective end point is located; and
    determining if said intermediate line segment is wholly included or wholly excluded based on the unique codes assigned to each respective endpoint.

6. The method according to claim 4, wherein assigning unique codes to each of the four regions comprises assigning a respective one of codes (00), (01), (11) and (10) to each of the four regions.

7. The method according to claim 1, wherein the candidate segment is a candidate line segment or a candidate polyline.

8. A mobile device comprising a rendering engine for performing the method of claim 1.

9. A non-transitory computer-readable medium having computer-readable code embodied therein for execution by a processor at a computing device for:
    determining a rendering region based on panning increments received for panning a previously rendered frame of a static graphic image;
    clipping a candidate segment against the rendering region to obtain at least one clipped segment contained within the rendering region; and
    rendering the at least one clipped segment and copying a portion of the previously rendered frame to provide a panned frame.

10. The computer-readable medium according to claim 9, wherein determining the rendering region comprises determining an L-shaped region having inner horizontal and vertical boundaries collinear with respective horizontal and vertical boundaries of the previously rendered frame and outer boundaries collinear with respective horizontal and vertical boundaries of the panned frame.

11. The computer-readable medium according to claim 10, wherein clipping the candidate segment comprises:
    performing a line clipping operation on the candidate segment, based on a rectangle determined by the horizontal and vertical boundaries of the panned frame to obtain one or more intermediate line segments; and
    clipping the one or more intermediate line segments against the rendering region to determine the one or more clipped line segments.

12. The computer-readable medium according to claim 11, wherein clipping the one or more intermediate line segments comprises:
    dividing a 2-dimensional plane containing the candidate segment into four regions with respect to the horizontal and vertical inner boundaries of the L-shaped rendering region;
    determining, for each of the one or more intermediate line segments, if said intermediate line segment is wholly included or wholly excluded, based on the respective regions in which the endpoints of said intermediate line segment are located; and
    clipping those intermediate line segments, that are not wholly included or wholly excluded, with respect to at least one of the horizontal and vertical inner boundaries of the L-shaped rendering region.

13. The computer-readable medium according to claim 12, wherein determining, for each of the one or more intermediate line segments, if said intermediate line segment is wholly included or wholly excluded comprises:
    assigning unique codes to each of the four regions;
    assigning one of the unique codes to each end point of the intermediate line segments, based on the region in which the respective end point is located; and
    determining if said intermediate line segment is wholly included or wholly excluded based on the unique codes assigned to each respective end point.

14. The computer-readable medium according to claim 13, wherein assigning unique codes to each of the four regions comprises assigning a respective one of codes (00), (01), (11) and (10) to each of the four regions.

15. The computer-readable medium according to claim 9, wherein the candidate segment is a candidate line segment or a candidate polyline.

* * * * *